Figure 1:
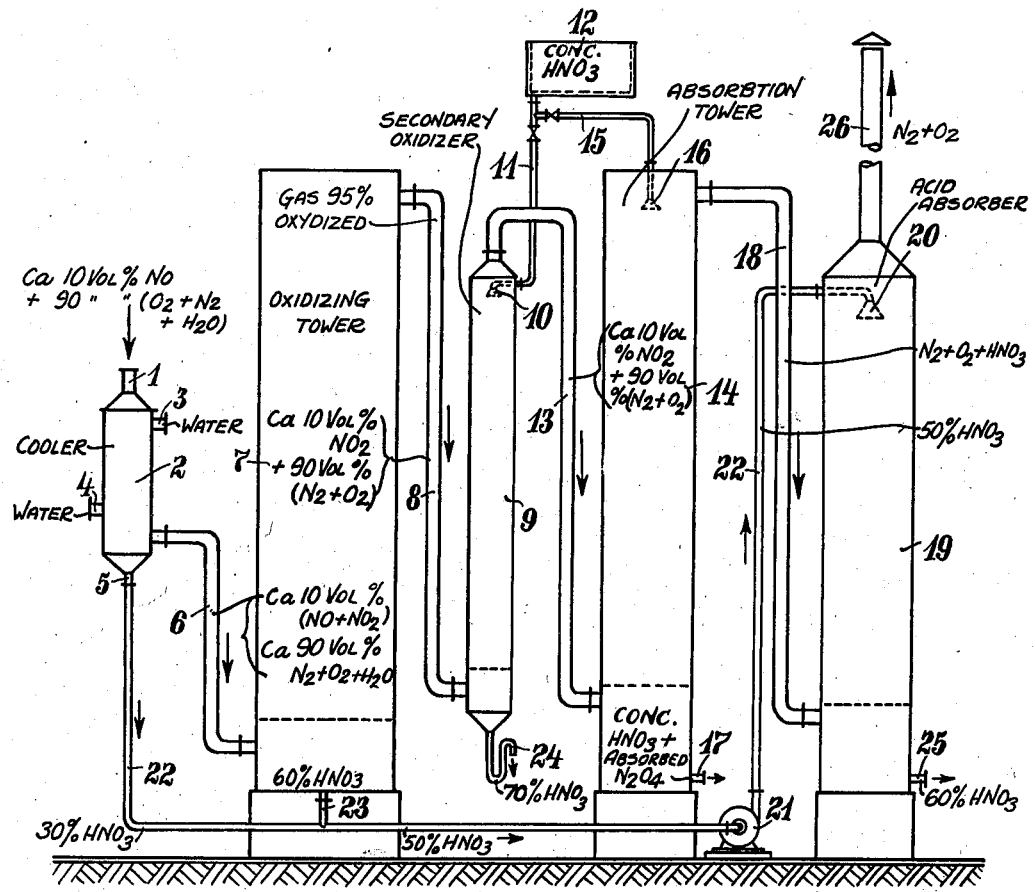

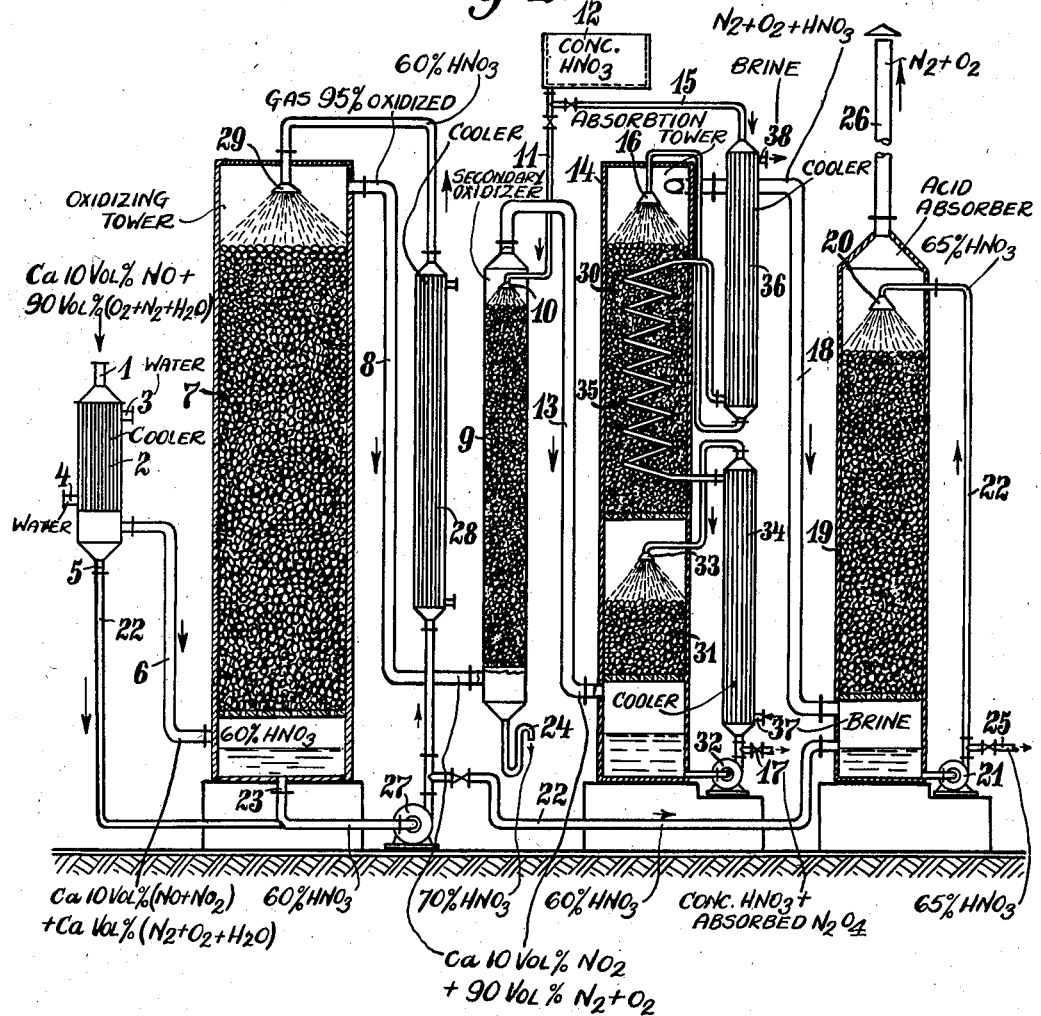

Patented Aug. 30, 1938

2,128,527

UNITED STATES PATENT OFFICE 2,128,527

PROCESS FOR THE ABSORPTION, IN HIGHLY CONCENTRATED NITRIC ACID, OF NITROUS GASES FORMED BY THE COMBUSTION OF AMMONIA

Thomas Fischer, Berlin, Germany, assignor to Bamag-Meguin Aktiengesellschaft, Berlin, Germany Application January 20, 1936, Serial No. 59,988
In Germany January 19, 1935

7 Claims. (Cl. 23—160)

(Granted under the provisions of sec. 14, act of March 2, 1927; 357 O. G. 5)

It is known that, in the production of nitric acid, the concentration of the resulting acid depends on the proportion of higher oxides of nitrogen present in the gaseous phase. For example, it is impossible to produce an acid having a concentration substantially above 60–62% by the absorption of the nitrogen oxides contained in the gases formed by the combustion of ammonia in air. Another cause that prevents the direct production of highly concentrated acid by the ammonia-combustion process, is the presence of water vapour—formed during the reaction itself—in the gases of combustion. Even if it were possible to dissolve the nitrogen oxides completely in the said water vapour, to form nitric acid, the concentration of the acid would not be increased beyond 78%. It has been proposed (German Patent 473601) to absorb the nitrous gases by more highly concentrated nitric acid in several stages, dilute acid being employed at first, and acid of progressively higher concentration in the subsequent stages. This procedure is necessary because the high proportion of steam in the gases from the combustion of ammonia must be removed in the first place, in order to avoid impairing the absorption, in the stages employing stronger acid, through the diluent action of the accompanying water vapours. On the other hand, the nitric acid itself is volatile in the more highly concentrated solution, and this property also leads to a relative dilution of the resulting acid. The said patent specification also mentions, as a special disadvantage, the circumstance that the lower oxides of nitrogen—as far as the trioxide—have a powerful reducing effect on nitric acid and thereby also cause dilution.

It has now been ascertained that, precisely by making use of this last circumstance, the effluent gases formed by burning ammonia in ordinary air can also be directly transformed into nitric acid of maximum concentration—nearly 100%—by absorption, in a single stage, in the following manner:—

The gases coming from the combustion furnace are first subjected to extremely rapid and intensive cooling, during which water alone, that is, water containing practically no acid, is deposited. It has been discovered that the velocity of oxidation of the nitrogen oxides at the high temperatures is insufficiently high to produce any considerable formation of nitric acid when intensive cooling is performed immediately after the gases issue from the combustion furnace. The gases thus freed from steam, and therefore practically dry, are now subjected to oxidation. The gas is accommodated, in known manner, in chambers in which the oxygen present in the gases of combustion can act on the lower oxides, whilst at the same time the separation of any residual moisture, and the carrying away of the resulting heat of oxidation, can be effected by direct or indirect cooling. The degree of oxidation of the gases treated in this manner varies between 90 and 95%. This degree of oxidation is then easily raised to nearly 100% by bringing the gases into contact (for example in a chamber filled with Raschig rings) with highly concentrated nitric acid, preferably diverted from the acid forming the end product. This acid oxidizes the remaining nitrous oxides to nitrogen dioxide or tetroxide, and itself undergoes partial reduction, so that an acid of 60–70% strength issues from the lower end of the pipe. It has been found that the quantity of nitric acid employed for this purpose is, at most, 10–20% of the total acid produced and therefore the step does not constitute any economic drawback.

These gases, in which nearly 100% of the nitrogen oxides are in the form of textroxide, can then be completely extracted, from the mixture of nitric oxide and residual air of combustion, by washing or absorption with highly concentrated nitric acid, in a single stage. The absorption is preferably effected at temperatures between $-10°$ and $-30°$ C.

The waste or residual gases, issuing from the absorption stage, while being completely freed from nitrogen textroxide, are laden with nitric acid vapour, in accordance with the vapour pressure of the absorption acid. This nitric-acid vapour can be washed out, with the acid coming from the drying and initial oxidizing apparatus, without any special cooling and without loss.

The highly concentrated acid, charged with nitrogen oxides, is freed from gas, in known manner, and returned to the absorption chamber. The nitrogen oxides recovered—in nearly 100% strength—during the degasification, for example, by simple heating, can be worked up into nitric acid in known manner.

The process according to the present invention may, in particular, be carried out under pressure.

In the attached drawings, Fig. 1 shows diagrammatically a plant for carrying out the method, and Fig. 2 illustrates an embodiment of the plant in greater detail, like parts being indicated by like reference numerals.

In the plant according to Fig. 1, the mixture of gases coming from the ammonia combustion furnace, namely, nitrogen oxides, water vapour and excess air, after having the greater part of the water vapour separated off in a first cooler not shown, are fed through a union 1 into a second tube cooler 2, where they are cooled down indirectly to such an extent that the rest of the moisture is separated out. The cooling medium is supplied to and discharged from the tube cooler 2 through unions 3 and 4. The separated water, which is obtained in the form of dilute nitric acid, leaves the cooler through a union 5. The gases are passed through a pipe 6 to an oxidizing tower 7. Here the nitric oxide gases, which are at first chiefly in the form of NO, are transformed into tetroxide under the action of the oxygen contained in the combustion gases. The heat developed during this oxidation may be dissipated in any convenient manner. The nitric acid formed in small quantities from the residual water and the higher nitrogen oxide gases is collected at the lower end of the tower and led off through a pipe 23. The oxidized gases pass through a pipe 8 into a tower 9 packed with filling bodies, where the gases are brought to a degree of oxidation approximating to 100%. The gases enter the tower at the bottom and flow through a stream of highly concentrated nitric acid from a sprinkler 10 supplied from a tank 12 through a pipe 11. The 60–70% nitric acid discharged through the union 24 is subjected to further treatment in known manner, for conversion, together with the tetroxide obtained later, into highly concentrated nitric acid. The gases issuing from the tower 9, completely oxidized under the action of the highly concentrated nitric acid, pass through a pipe 13 into a cooled absorption tower 14, where also they are caused to move from below upwards in opposition to a stream of concentrated nitric acid, which is supplied from the tank 12 through a pipe 15 to a sprinkler 16. The nitric acid washes out the nitric oxides from the gases and accordingly impoverishes them. This acid, containing nitrogen tetroxide, is drawn off through the union 17 and is further treated in a manner known per se in the factories. The residual acid gases, which leave the tower 14 at the upper end, flow through the pipe 18 into the bottom of a tower 19. The gases freed of oxide vapours still contain HNO3, which is washed out in a tower 19. For this purpose diluted nitric acid is used which is supplied to a sprinkler 20 through a pump 21. This diluted nitric acid comes through the pipe 22 from the union 5 of the tube cooler, as well as from the union pipe 23 of the oxidizing tower 7. The weak nitric acid enriched with HNO3 gases is drawn off through the union 25 and contains the reaction water necessary for the formation of HNO3 and is treated with the tetroxide obtained at the unions 17 and 24 to form highly concentrated acid. The gases which escape through the flue 16 of the tower 19 are now free of nitric acid as well as oxide vapours.

In Fig. 2 the diagrammatic plant of Fig. 1 is shown in more detail.

The oxidizing towers 7 and 9 and also the absorption tower 19 are packed with filling bodies. The oxidizing tower 7 is cooled with the aid of a pump 27 circulating the nitric acid formed in the cooler 2 and the tower itself, which acid on its way is indirectly cooled by means of an interposed tube cooler 28, whence it is returned to the sprinkler 29. Thereby general cooling of the oxidizing tower 7 is assured. The supply of the weak acid to the sprinkler 20 of the washing tower 19 is effected here substantially as indicated in Fig. 1. The only difference is that the pipe 22 is branched off from the cooling circulation for the oxidizing tower 7 and leads to a sump at the lower end of the tower 19, to which is attached the pump 21 circulating the weak nitric acid repeatedly through the sprinkler 20 of the tower 19. The discharge is again effected through the union 25.

Fig. 2 also shows, by way of example, an embodiment of means effecting the cooling of the absorption tower 14. The filling bodies in this tower are divided into two layers. The lowermost part of the tower with the layer 31 is cooled by nitric acid, which is circulated by means of a pump 32 and supplied to a sprinkler 33. In this circulation is interposed a brine-cooled acid cooler 34. The upper part of the tower with the layer 30 of filling bodies is indirectly cooled by means of a brine coil 35. The highly concentrated nitric acid, which is supplied to the sprinkler 16 through the pipe 15 from the tank 12 first passes, to be rendered more effective, through the tube cooler 36, which is also cooled by means of brine. In the example the coolers 34, 36 and the cooling coil 35 are coupled in series in the brine flow in such a manner that the brine which enters through the union 37 passes in succession through the cooler 34, the coil 35 and the cooler 36, leaving this through the union 38.

I claim:—

1. Process for the absorption, in highly concentrated nitric acid, of the nitrogen oxide gases formed by the combustion of ammonia, comprising, in combination, the steps of partially drying the combustion products by rapid and intensive cooling to separate substantially acid-free water, oxidizing the partially dried gases initially in the presence of circulating dilute nitric acid derived from said partial drying step and said initial oxidation step and finally up to substantially 100% nitrogen tetroxide by reduction of highly concentrated nitric acid, and absorbing the resulting tetroxide with highly concentrated nitric acid in a single stage.

2. Process for the absorption, in highly concentrated nitric acid, of the nitrogen oxide gases formed by the combustion of ammonia, comprising treating the combustion products while flowing continuously under pressure, firstly to separate water containing practically no acid by rapid and intensive cooling, secondly to oxidize the lower nitrogen oxides initially in the presence of circulating dilute nitric acid derived from said partial drying stage and said initial oxidation stage and further in the presence of highly concentrated nitric acid, and thirdly by absorbing the resultant higher oxide gases with highly concentrated nitric acid in a single stage.

3. Process for the absorption, in highly concentrated nitric acid, of the nitrogen oxide gases formed by the combustion of ammonia, comprising, in combination, the steps of partially drying the combustion products, subjecting the partially dried lower oxides to preliminary oxidation in the presence of circulating dilute nitric acid derived from said partial drying step and said preliminary oxidation step, subjecting the resultant partially oxidized mixture to final oxidation in the presence of highly concentrated nitric acid, absorbing the resulting higher oxide gases with highly concentrated nitric acid in a single stage, and washing out of the waste gases nitric acid vapours carried off from the absorption step with dilute nitric acid separated during said partial drying and preliminary oxidation steps.

4. Process for the absorption, in highly concentrated nitric acid, of the nitrogen oxide gases formed by the combustion of ammonia, comprising treating the combustion products while flowing continuously under pressure, firstly to dry them partially by rapid cooling, secondly to oxidize the lower nitrogen oxides initially in the presence of circulating dilute nitric acid derived from said partial drying stage and said initial oxidation stage and further in the presence of highly concentrated nitric acid up to substantially 100% nitrogen tetroxide, thirdly by absorbing said tetroxide with highly concentrated nitric acid in a single stage, and fourthly to free the waste gases from nitric acid vapours carried off from the absorption stage by washing with dilute nitric acid separated during said partial drying and initial oxidation stages.

5. Apparatus for effecting the absorption, in highly concentrated nitric acid, of the nitrogen oxide vapours formed by the combustion of ammonia, comprising, in combination, means for drying the combustion products by rapid cooling, an oxidation chamber wherein residual water is caused to form dilute nitric acid with the higher oxides present and the lower oxides are raised to higher oxides by the excess oxygen present in said products, means for circulating through said chamber dilute nitric acid derived from said drying means and the chamber itself, an oxidation tower wherein the oxides are brought to substantially 100% nitrogen tetroxide, means supplying highly concentrated nitric acid to said tower in counterflow to the gases passing therethrough, an absorption tower, means supplying highly concentrated nitric acid to said absorption tower in counterflow to the gases passing therethrough and as an absorbent for the nitrogen tetroxide content of said gases, and an outlet for waste gases from said absorption tower.

6. Apparatus for effecting the absorption, in highly concentrated nitric acid of the nitrogen oxide gases formed by the combustion of ammonia, comprising, in combination, means for rapidly and intensively cooling the combustion products to free them from water containing practically no acid, an oxidizing chamber wherein residual water is caused to form dilute nitric acid with the higher oxides present and the lower oxides are raised to higher oxides by the excess oxygen present in said products, an oxidation tower wherein the oxides are raised substantially to 100% nitrogen tetroxide, an absorption tower, means supplying highly concentrated nitric acid in counterflow to the gases passing through said tower and as an absorbent for the nitrogen tetroxide content of said gases, a washing tower for waste gases issuing from said absorption tower, and means supplying dilute nitric acid derived from said oxidizing chamber in counterflow to the waste gases passing through said washing tower for washing nitric acid vapours from said waste gases.

7. Process for the absorption, in highly concentrated nitric acid, of the nitrogen oxide gases formed by the combustion of ammonia, comprising, in combination, the steps of freeing the combustion products from water vapour, oxidizing the water-freed gases initially by the excess oxygen content of the combustion products in the presence of circulating cooling nitric acid derived from said initial oxidation step, and finally by reduction of highly concentrated nitric acid supplied in limited quantity sufficient for oxidizing residual lower oxides substantially up to 100% nitrogen tetroxide, absorbing said tetroxide with highly concentrated nitric acid in a single stage, and washing out of the waste gases nitric acid vapours carried off from the absorption step with dilute nitric acid separated prior to and during the initial oxidation.

THOMAS FISCHER.